United States Patent [19]

Haghiri-Tehrani et al.

[11] Patent Number: 4,639,585
[45] Date of Patent: Jan. 27, 1987

[54] DATA CARRIER WITH AN IC MODULE AND A METHOD FOR PRODUCING SUCH A DATA CARRIER

[75] Inventors: Yahya Haghiri-Tehrani; Joachim Hoppe, both of Munich, Fed. Rep. of Germany

[73] Assignee: GAO Gesellschaft fur Automation und Organisation mbH, Munich, Fed. Rep. of Germany

[21] Appl. No.: 649,378

[22] Filed: Sep. 11, 1984

[30] Foreign Application Priority Data

May 29, 1984 [DE] Fed. Rep. of Germany ....... 3420051

[51] Int. Cl.⁴ ............................................. G06K 15/00
[52] U.S. Cl. .................................... 235/492; 235/487
[58] Field of Search ................................. 235/487, 492

[56] References Cited

U.S. PATENT DOCUMENTS 4,550,248 10/1985 Hoppe et al. ...................... 235/487

Primary Examiner—Harold I. Pitts
Attorney, Agent, or Firm—Robert J. Koch

[57] ABSTRACT

The integrated circuit embedded in a data carrier and the contact surfaces connected with this circuit are to be protected against bending of the data carrier. For this purpose, the data carrier is divided into two areas, the first one, which bears the circuit and is generally small compared to the second area, being connected to the second area via a predetermined breaking point. Stress which occurs when the data carrier is bent is kept away from the circuit, or transmitted only weakly to it, by the predetermined breaking point.

13 Claims, 9 Drawing Figures

4,639,585

DATA CARRIER WITH AN IC MODULE AND A METHOD FOR PRODUCING SUCH A DATA CARRIER

BACKGROUND OF THE INVENTION

1. Field of the Invention

The present invention relates to a data carrier with an IC module for processing electrical signals, the IC module being disposed in the interior of the data carrier and connected via leads to elements for communication with peripheral devices, in particular contact surfaces.

2. Description of Related Technology

German Auslegeschrift No. 29 20 012 describes an identification card with an integrated circuit. The IC module is disposed on a separate carrier element together with its contact surfaces and leads. The carrier element is held, in the finished card, by elastic connecting elements in a recess in the card inlay. The recess in the card has a larger periphery than the carrier element. The elastic connecting elements provide the carrier element with a floating mounting in the card recess, so that it is not wedged in the card recess even when subjected to great bending load. This type of mounting effectively keeps bending stress in the card away from the carrier element and thus from the sensitive electrical components such as the integrated circuit and the soldering joints.

A further data carrier with an integrated circuit is described in German Offenlegungsschrift No. 31 31 216. The IC module here is also disposed together with its contact surfaces and leads on a separate carrier element. The carrier element has a relatively rigid design in order to protect the electrical components; for example, the parts may be cast into a rigid plastic part. The carrier element is connected with the card via an anchoring element. The anchoring element protrudes beyond the edge of the carrier element and is preferably firmly connected to the latter. The area of the anchoring element which protrudes beyond the carrier element is inserted between card layers and connected thereto. This way of attaching the carrier element to the card also keeps bending load during use of the card away from the sensitive electrical components.

SUMMARY OF THE INVENTION

The protection of the IC module and the contact surfaces, leads and soldering joints is very good in the two abovedescribed data carriers. Since these data carriers are generally supposed to be operable for a relatively long period of use (several years), the technical effort expended in producing these data carriers is justified.

However, more and more data carriers which are intended to be valid for only a relatively short period of time have come into use recently. An example of such a data carrier is the so-called "telephone card", used for making telephone calls without use of cash on special telephones. The customer purchases at a dispensing office a card having a given value and thus a certain number of units of charge. For every telephone call a corresponding number of units is deducted electrically. When all units have been used up, the card is invalid and is generally thrown away.

The efforts in embedding an IC module in the card as described above seem too great for such deduct or expire cards. On the other hand, mechanical flexibility and a high degree of electrical reliability are required of these cards as well.

Therefore, the invention is based on the problem of proposing a data carrier with an integrated circuit in which the circuit and the communication elements or contact surfaces connected thereto via leads are protected against mechanical stress, but which is easy and economical to construct and produce.

This problem is solved according to the invention by the features stated in the main claim.

The predetermined breaking points formed as a weakening or interruption in the card construction in the vicinity of the IC module, the leads and the contact surfaces (called "the IC area" in the following) cause this area to be mechanically decoupled to a large extent from the remaining card area. The weakening or interruptions in the card construction between the IC area and the remaining card area lead to disturbances in the homogeneity of the card material which interrupt the bending stress caused by deformation of the card, thereby keeping it away from the IC area to a large extent. Overstress caused by strong bending during use of the card is "intercepted" by the predetermined breaking points before it leads to damage of the IC module or its leads, so that damage to the card body is possible but the electrical operation of the card is not interfered with.

The predetermined breaking points, which disturb the rigidity of the card construction due to weakening or interruptions, may be realized, for example, if the cross-section of the card is reduced. In the most simple case, the card for this purpose has a thinner design along a line separating the IC area from the remaining card area, which may also be stamped, for example. Further, the card cross-section may only be reduced locally, for example by a perforation or one or more cutting lines. A further possibility of designing predetermined breaking points is to incorporate materials which do not connect, or only connect to a slight degree, with the remaining card material or are less rigid than the remaining card material and give way under stress, thus keeping the bending stress of the card away from the IC area.

It is guaranteed in all cases that the homogeneous card construction surrounding the IC area is interrupted or weakened in such a way that bending stress applied to the card cannot affect the IC area to a full extent beyond the dividing line.

The inventive solution exhibits several advantages with respect to the cards known up to now. The newly proposed cards are characterized by a particularly simple construction; in particular, a separate carrier element can be dispensed with and the IC module together with the contact surfaces directly anchored in the card.

When the card construction is to be disturbed in its homogeneity by special materials, the latter may be incorporated in the card independently of the electrical components since the predetermined breaking points and the IC area do not overlap. Thus, the most favorable conditions both for the incorporation of the electrical parts and for the production of the breaking point may be selected, respectively.

If the homogeneity of the card construction is interrupted by a perforation, recesses or simply by cutting lines, the related working steps are usually carried out subsequently to the incorporation of the IC module in the card. Thus, the card may be produced by one of the methods known up to now, and later provided with the breaking points independently of the preceding card production in a final operation, which expediently coincides with the cards being punched out of the so-called "multiple copy sheet".

All the stated methods of designing the predetermined breaking points which disturb the homogeneous card construction are characterized by a simple and economical production, while sufficient protection of the sensitive electrical components is still guaranteed.

If the card should be subjected to great mechanical bending stress some time, it is deformed when a critical stress is exceeded, thereby causing the predetermined breaking point to be jolted, stretch or tear open. This makes the overstress recognizable on the card, providing the advantage that mechanical overstressing, if any, can be proven in case of complaint, for example.

BRIEF DESCRIPTION OF THE DRAWINGS

Further advantages and developments of the invention can be found in the subclaims and the embodiments, which shall be described in the following with reference to the figures.

These show.

DETAILED DESCRIPTION OF THE PREFERRED EMBODIMENT

Figure 1:
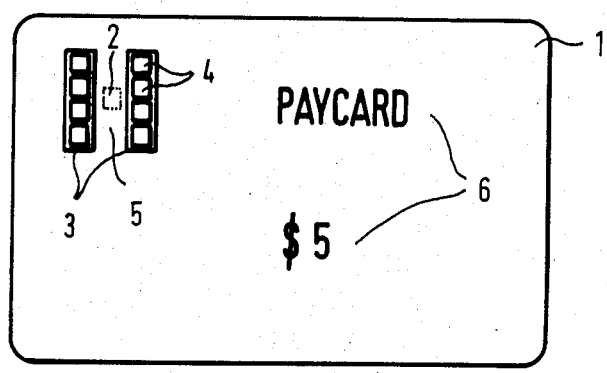
FIG. 1 is a card with an embedded IC module and contact surfaces, from the top

FIG. 1 shows a card 1 from the top. The card contains one or more integrated circuits 2, which, in the example shown, are disposed between two contact surface areas 3 each having four single contacts 4, and connected to the contacts via leads not visible from the outside. IC module 2 is preferably disposed in the interior of the card where it is protected. The card as in FIG. 1 may be produced, for example, as described in patent application No. P 33 38 597, filed by the applicant.

The card is usually provided with printing 6 stating, for example, the value of an expire card.

The card corresponds to the norms applying to credit cards and has, among other properties, a flexible design as prescribed by the norm. Since the card is subjected to a great variety of stresses in daily use, whereby differently directed forces act upon different places in the card, forces may arise in the interior of the card which lead to destruction of the IC module, the leads or the soldering joints.

Figure 2:
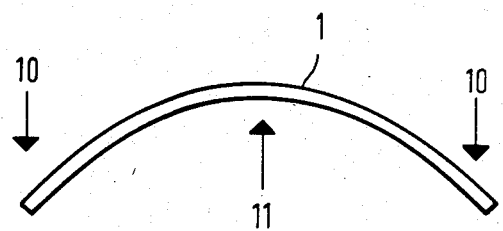
FIG. 2 is a card in a bent state, in cross-section

These stresses which come about in daily use can be simulated to a certain extent in laboratory experiments, by subjecting the card to various alternating stresses due to the action of forces 10, 11, as shown in FIG. 2 by way of example. In the following, some cases of stress which are known to arise during use of the card shall be demonstrated with reference to FIG. 3.

Figure 3A:
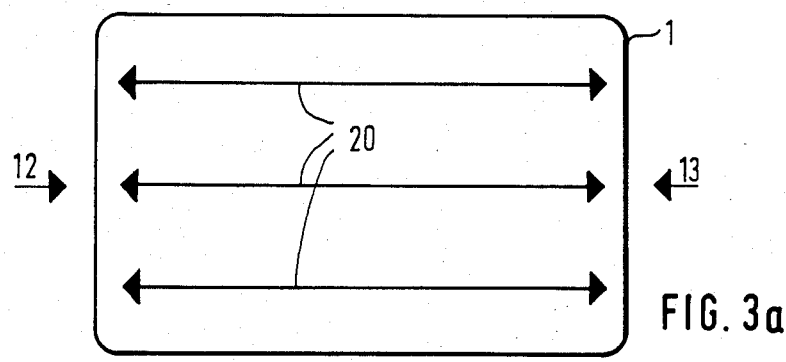
FIGS. 3a-3c are schematic views of the bending stresses when the card is bent in different ways

When the card is pressed together and thus bent by forces 12, 13 which act upon the short edges as shown in FIG. 3a, the greatest bending stresses occur parallel to the long side of the card. In FIG. 3a these bending stresses are indicated by three lines 20. The same bending and the same bending stresses also arise when the card is bent out of its flat position of rest by differently directed forces applied to three points, as shown by arrows 10, 11 in FIG. 2.

Figure 3B:
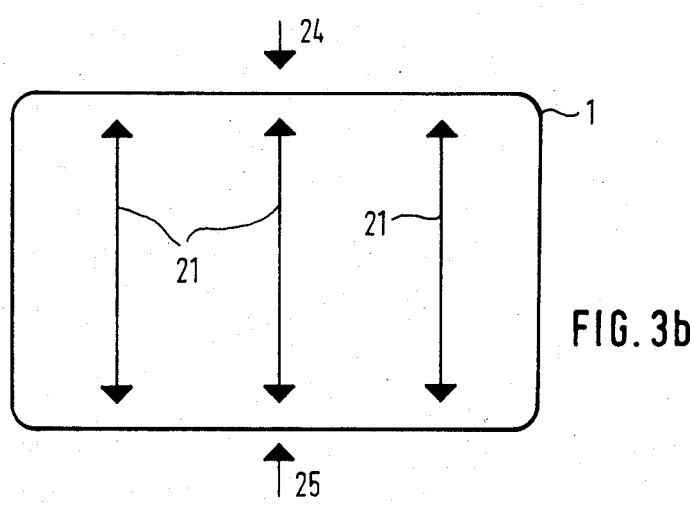

Similar bending stresses to those in FIG. 3a result when the card is bent by forces 24, 25 applied on its long sides. This case is shown in FIG. 3b. The bending stresses arising in this case are indicated by lines 21.

The bending stresses indicated by lines 20, 21 in FIGS. 3a and 3b only hold strictly when the forces causing the bending are applied along the entire length of the side edges. When forces are applied punctually, laterally directed bending stresses arise in addition to the bending stresses running between the points of application and indicated in FIGS. 3a and 3b, thereby bending the card like a saddle surface.

However, the differences in the card bending between punctually and linearly applied forces are small, so that the schematic views in FIGS. 3a and 3b portray the real state of affairs quite correctly.

Figure 3C:
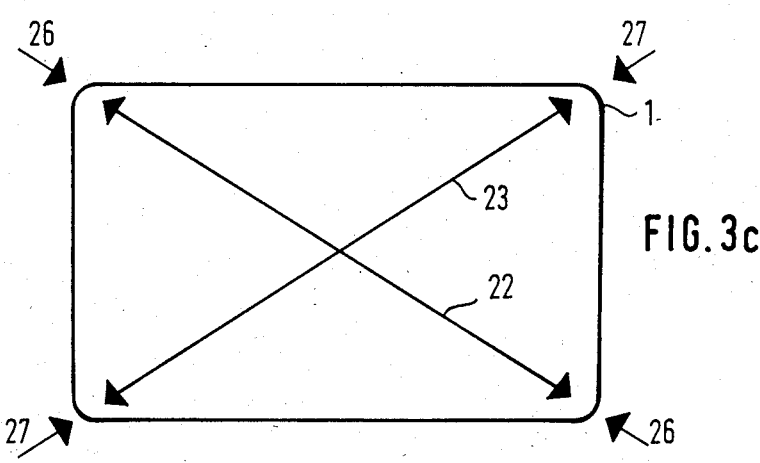

A further type of bending consists in bending the card along a diagonal by forces 26, 27. The bending stresses thereby occurring are indicated in FIG. 3c. Depending on which of the opposite corners the forces are applied to, one of the bending stress lines 22, 23 as shown in FIG. 3c results. Instead of opposite corners being pressed together, there is a similar bending stress pattern when torsional forces are applied to opposite corners of the card.

In daily use, the stresses shown in FIGS. 3a, 3b, 3c will usually not occur separately but in combination. The corner areas of the card have proved to be the areas least subject to stress, which might advantageously be considered for the incorporation of the sensitive IC module and the contact surfaces. The stresses on the card have proven to be smallest in these corner areas.

Figure 4:
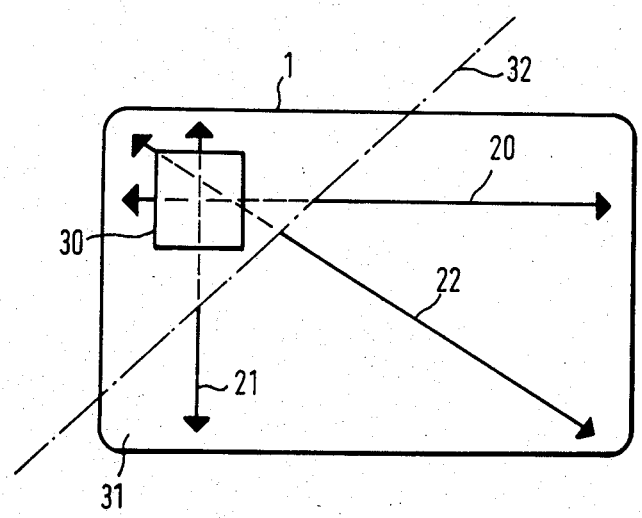
FIG. 4 is the inventive weakening of the card material to interrupt the bending stress lines

FIG. 4 shows by box 30 the area in which the IC module along with its leads and contact surfaces should preferably be incorporated. The figure also shows the bending stress lines 20, 21, 22 which have already been explained with reference to FIG. 3. Although the IC area 30 is subjected to less stress than the center of the card, for example, it is still necessary to take additional steps to protect the IC module.

For this purpose, the IC area 30 and the remaining card area 31 are decoupled as well as possible. This is accomplished according to the invention by a so-called "predetermined breaking point" which weakens or interrupts the homogeneous card material in the vicinity of the IC area. This also interrupts bending stress lines 20, 21, 22 so that the forces in action due to the stress are transferred to the IC area 30 in a weakened form or, in the case of excessive forces, kept away from the IC area by deformation of the card construction. FIG. 4 indicates such an interruption in the bending stress lines by way of example in line 32.

The partial interruption or weakening of the card is usually designed in such a way that the predetermined breaking point is not made use of in normal use, i.e. under slight mechanical stress. The inventive card thus behaves like a previously produced card without any breaking point. Only when a certain bending stress is exceeded does the incorporated breaking point take effect, keeping the great mechanical stress away from the IC area. The stress limit beyond which the breaking point is to take effect may be varied within a wide range and thus adapted to the particular conditions at hand. The conditions are given, for example, by the mechanical stability of the IC module, which in turn depends on its size and shape.

Figure 5:
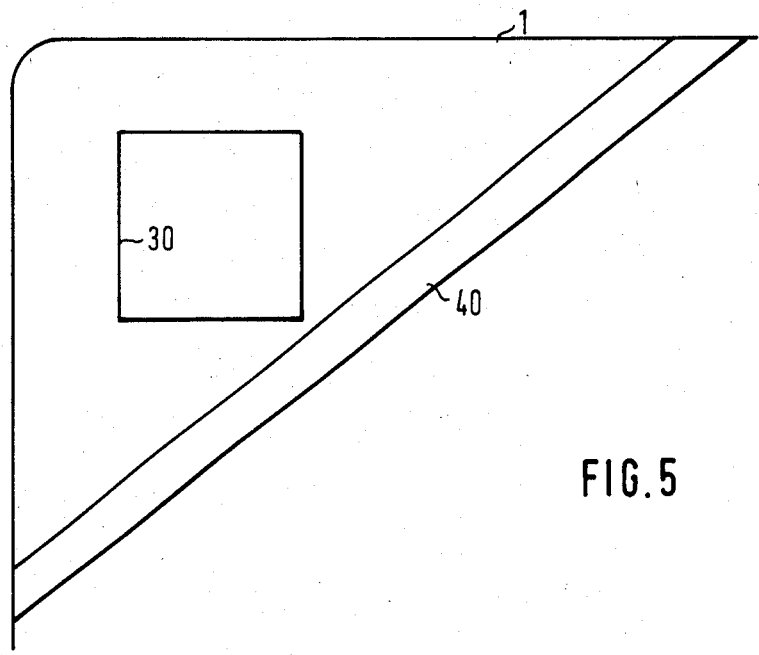
FIGS. 5-7 are different embodiments of the invention
Figure 6:
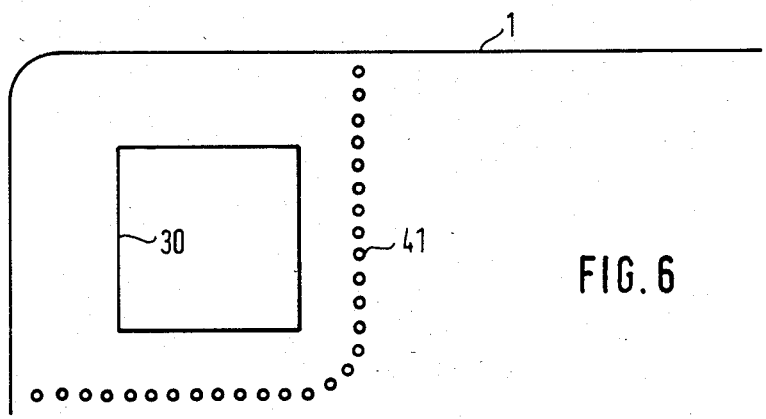
Figure 7:
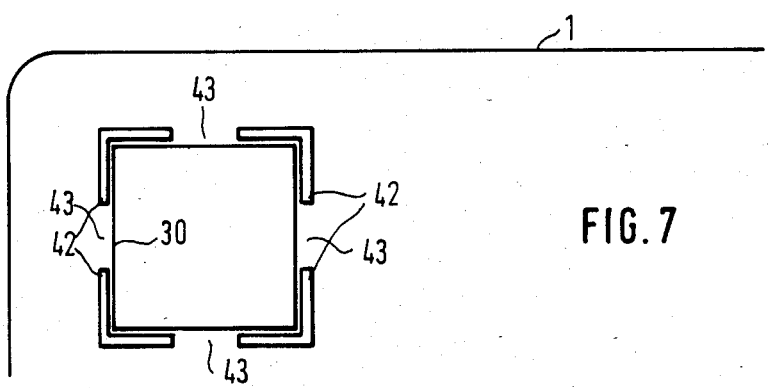

Different embodiments of the inventive breaking point or zone are shown in FIGS. 5, 6, 7. Each of these figures shows a section of a card 1 in which the contact surfaces and the IC module enclose an IC area 30.

In FIG. 5 the homogeneous card material is weakened, thereby forming a breaking point, along a line or zone 40 which extends diagonally to the IC area. The weakened area 40 may, in the most simple case, consist in a thinner design of the card in this area, for example, by means of a groove or stamping in the card surface. Instead of reducing the card cross-section on one or both surfaces, one may also weaken the card in its inner construction. For this purpose, the core material of the card, in the case of a three-layer card, for example, may be omitted along a weakening zone 40. During the lamination process, in which pressure and heat are generally used, the omitted area of the card core may be slightly closed by the flow of softening card material, which should be taken into consideration when dimensioning the omitted zone. In this embodiment, the two card cover films constitute a unified, smooth surface, while the breaking point is arranged in the interior of the card.

Instead of omitting card material, material may also be used in the area of zone 40 as a card core or as an additional thin separating layer which does not connect, or only connects poorly, with the cover films or is less rigid than the remaining card material. For example, a thin strip of polyester or teflon may considerably reduce the connection between the two card cover films. Further, a paper strip may be embedded which does not connect with the PVC material but remains resilient itself.

FIG. 6 shows a further embodiment of the invention in which the IC area 30 is surrounded by a breaking point along a curved line 41. This may be accomplished, in the most simple case, by a perforation 41 in the homogeneous card material. The local removal of card material reduces the rigidity of the card along perforation line 41 so that when the card is subjected to great bending stress it is bent along perforation line 41. Transmission of the bending stress to the sensitive IC area 30 is thereby reduced to the extent that the IC module along with the contact surfaces and the leads are protected against being destroyed.

Finally, FIG. 7 shows an embodiment which has proven to be particularly effective in practice. This embodiment is characterized by the fact that the IC area 30 is relieved to a great extent of the mechanical stress on the remaining card by recesses 42 in the card material in the vicinity of the IC area. In the example shown, recesses 42 are each arranged at the corners of the IC area. The IC area is thus only connected with the card by four narrow strips 43 made of card material. Since the cards are usually produced of flexible plastic, the strips 43 constitute an elastic mounting for the IC area and serve as a breaking point at the same time. The arrangement of recesses 42 at the corners of the IC area serves in particular to keep diagonal bending 22 of the card away from the IC area, as explained with reference to FIG. 3c.

Variations in the embodiment just described consist in providing only cuts in the card instead of recesses 42, which are preferably 0.2 to 0.5 mm wide. Further, it may suffice, depending on the stress expected, to provide only the corner of the IC area pointing towards the middle of the card with a recess or a cut, since it has proved to be the case that most of the bending stress is kept away from the IC area when this corner is relieved.

The methods for producing cards with inventive breaking points have in common that they may be carried out independently of the incorporation of the IC module. Thus, the most favorable conditions may be set for both the design of the breaking point and the IC incorporation, respectively.

A paper strip or a film strip which does not connect with the remaining card material may be embedded in such a way that the card material is omitted in accordance with the weakening zone and the paper or film strip inserted in its place. The subsequent lamination of the card may be carried out under optimal lamination conditions in particular in the area of the embedded strip since the IC area, which may require different conditions (e.g. less pressure), does not overlap with the remaining card area, which also contains the breaking point.

When the recess in the card core layer is to be kept free instead of the paper or film strip, attention must be paid that the recess is not closed by the flow of heated card material due to the high pressure which is usual in hot lamination. This effect may be taken into consideration by accordingly dimensioning one or more recesses as well as the laminating conditions. When conventional PVC films and conventional lamination conditions are used, good results are obtained with recesses which are 0.5 to 2 mm wide. When the card layers are glued cold, the size of the recesses remains unchanged during the gluing process.

In the other embodiments presented, the breaking point is produced by weakening the homogeneous card construction after the IC module has been incorporated into the card. When a uniform reduction of the cross-section of the card along a line is desired, this may be obtained in the most simple case by stamping or milling a groove. Punching and cutting are also carried out by an accordingly formed tool on the finished card only after IC incorporation is completed.

Since the production of synthetic cards is usually carried out in relatively large "multiple copy sheets", which contain 21 (3×7) single cards, for example, the punching of the recesses, the perforations or the cuts may preferably be carried out jointly when the cards are punched out of the sheet, so that no additional working step is required. This method offers the further advantage that the punched out areas are always located at the same place in different cards so that narrow tolerances may be observed.

We claim:

1. A data carrier with an IC module for processing electrical signals, in which the IC module is disposed in the interior of the data carrier and connected via leads to contact surfaces arranged in the vicinity of the IC module, communication taking place with peripheral units via these contact surfaces, characterized in that a first area of the data carrier in which the IC module, the leads and the contact surfaces are provided is connected with a second, remaining area of the data carrier by one or more predetermined breaking points arranged along a line separating the two areas and which reduce transmission of bending stresses from one area of the card to the other.

2. A data carrier as in claim 1, characterized in that the card has a predetermined rigidity and the predetermined breaking point is designed as a weakening and/or interruption in the card construction which locally reduces the rigidity of the card.

3. A data carrier as in claim 2, characterized in that the weakened areas and/or interruptions in the card construction are obtained, in an at least three-layer card comprising two cover layers and one card core layer, by a hollow space formed by the two card cover layers and a recess in the card core layer.

4. A data carrier as in claim 2, characterized in that the weakened areas and/or interruptions in the card construction are obtained by embedding an additional material having lower rigidity values than the surrounding card material and/or not connecting, or only connecting poorly, with the surrounding card material.

5. A data carrier as in claim 2, characterized in that the weakened areas and/or interruptions in the card construction are obtained by partial reduction of the cross-section of the card.

6. A data carrier as in claim 5, characterized in that the reduction in the cross-section of the card is obtained by perforations, recesses or cutting lines.

7. A data carrier as in claim 5, characterized in that the reduction in the cross-section of the card is obtained by making the card material thinner along a line.

8. A data carrier as in claim 2, characterized in that the weakened areas and/or interruptions are adapted to the circumference of the IC module and to the contact surfaces.

9. A method for producing a data carrier with an IC module for processing electrical signals, in which the IC module is disposed in the interior of the data carrier and connected via leads to contact surfaces arranged in the vicinity of the IC module, exhibiting a first area of the data carrier in which the IC module, the leads and the contact surfaces are provided is connected with a second, remaining area of the data carrier by one or more predetermined breaking points arranged along a line separating the two areas and which reduce transmission of bending stresses from one area of the card to the other comprising the steps of reducing the cross-section of the data carrier to produce the predetermined breaking points after laminating the data carrier, which may consist of several layers.

10. A method for producing a data carrier as in claim 9, characterized in that the cross-section of the data carrier is reduced by cuts, punching or perforation.

11. A method for producing a data carrier as in claim 9, characterized in that the cross-section of the data carrier is reduced by being stamped.

12. A method for producing a data carrier in which an IC module and contact surfaces connected thereto via leads are connected to an at least three-layer data carrier card, characterized by the following steps:
preparing two card cover layers and at least one card core layer,
applying one or more recesses in the card core layers, in areas of the subsequent predetermined breaking points,
laminating the various card layers, the IC module being connected with the card layers.

13. A method for producing a data carrier as in claim 12, characterized in that an additional material having lower rigidity values than the surrounding card material and/or not connecting, or connecting only poorly, with the card material, is inserted into the recess in the card core layer before the card layers are laminated.

* * * * *